(12) United States Patent
Nam et al.

(10) Patent No.: US 11,240,535 B2
(45) Date of Patent: Feb. 1, 2022

(54) METHOD AND DEVICE FOR FILTERING IMAGE IN IMAGE CODING SYSTEM

(71) Applicant: LG Electronics Inc., Seoul (KR)

(72) Inventors: Junghak Nam, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 16/651,979

(22) PCT Filed: Jul. 2, 2018

(86) PCT No.: PCT/KR2018/007464
§ 371 (c)(1),
(2) Date: Mar. 27, 2020

(87) PCT Pub. No.: WO2019/066211
PCT Pub. Date: Apr. 4, 2019

(65) Prior Publication Data
US 2020/0267414 A1    Aug. 20, 2020

Related U.S. Application Data

(60) Provisional application No. 62/565,064, filed on Sep. 28, 2017.

(51) Int. Cl.
*H04N 7/12* (2006.01)
*H04N 19/82* (2014.01)
(Continued)

(52) U.S. Cl.
CPC .......... *H04N 19/82* (2014.11); *H04N 19/117* (2014.11); *H04N 19/176* (2014.11);
(Continued)

(58) Field of Classification Search
CPC .................................................. H04N 19/635
See application file for complete search history.

(56) References Cited

U.S. PATENT DOCUMENTS

2013/0142251 A1    6/2013 Maani

FOREIGN PATENT DOCUMENTS

| KR | 101337990 | 12/2013 |
| KR | 101372965 | 3/2014 |
| KR | 20160031061 | 3/2016 |

OTHER PUBLICATIONS

Chen et al., "Algorithm Description of Joint Exploration Test Model 7 (JEM 7)", JVET-G1001-v1, Joint Video Exploration Team (JVET) of ITU-T SG 16 WP 3 and ISO/IEC JTC 1/SC 29/WG 11 7th Meeting: Torino, IT, Jul. 13-21, 2017, 48 pages.

*Primary Examiner* — Y Lee
(74) *Attorney, Agent, or Firm* — Fish & Richardson P.C.

(57) ABSTRACT

A filtering method by a decoding device according to the present invention comprises the steps of: receiving information relating to ALF control depth; deciding an ALF control unit on the basis of information relating to the division depth and the ALF control depth of a current block in a restoration picture with respect to a current picture; determining whether or not ALF is applied to the current block in an ALF control unit level; and, if the ALF is determined to be applied to the current block, performing the ALF for the current block. In the filtering method, the current picture is recursively divided on the basis of a QTBT structure, and the current block is one of blocks divided on the basis of the QTBT structure.

13 Claims, 9 Drawing Sheets

(51) Int. Cl.
*H04N 19/117* (2014.01)
*H04N 19/176* (2014.01)
*H04N 19/192* (2014.01)
*H04N 19/635* (2014.01)
*H04N 19/189* (2014.01)
*H04N 19/64* (2014.01)

(52) U.S. Cl.
CPC ......... *H04N 19/189* (2014.11); *H04N 19/192* (2014.11); *H04N 19/635* (2014.11); *H04N 19/647* (2014.11)

FIG. 3
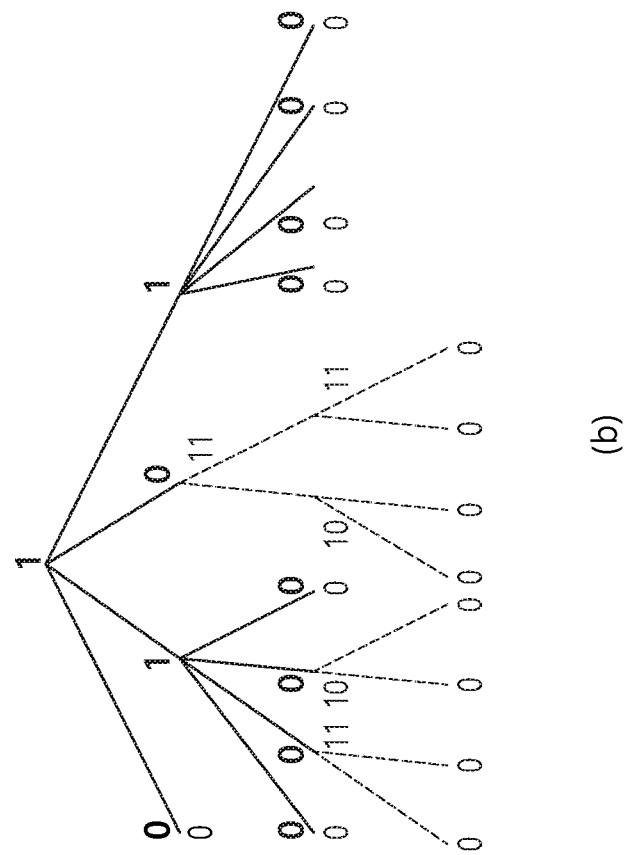
(b)
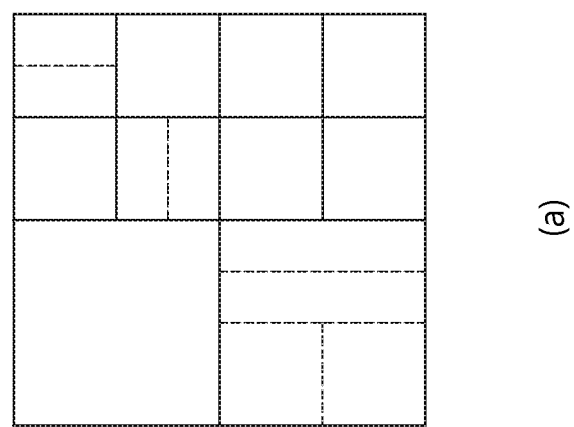
(a)

FIG. 5
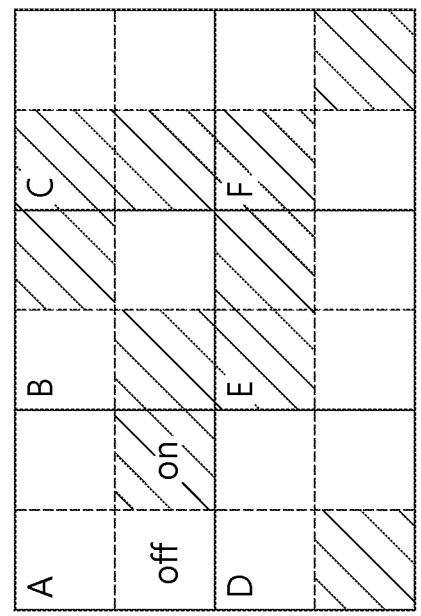
(b)
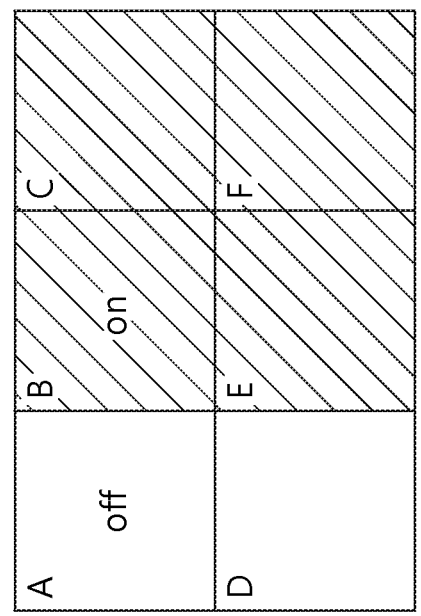
(a)

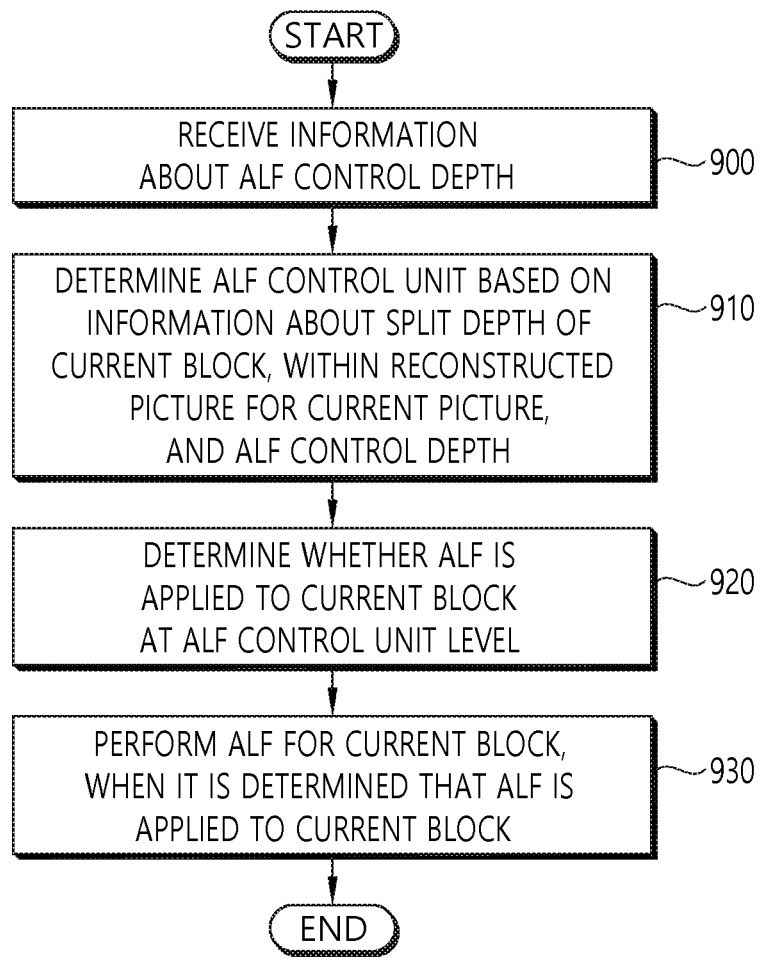

METHOD AND DEVICE FOR FILTERING IMAGE IN IMAGE CODING SYSTEM

CROSS-REFERENCE TO RELATED APPLICATIONS

This application is a National Stage application under 35 U.S.C. § 371 of International Application No. PCT/KR2018/007464, filed on Jul. 2, 2018, which claims the benefit of U.S. Provisional Application No. 62/565,064 filed on Sep. 28, 2017. The disclosures of the prior applications are incorporated by reference in their entirety.

BACKGROUND OF THE DISCLOSURE

Field of the Disclosure

The present disclosure relates to an image coding technology, and more particularly, to an image filtering method and apparatus in an image coding system.

Related Art

Recently, the demand for high-definition and high-quality images is increasing in various applications. As images have higher resolution and higher quality, the amount of information about the corresponding images increases together.

As the amount of information increases, devices with various performances and networks with various environments are emerging. As the devices with various performances and the networks with various environments emerge, the same content is available in various qualities.

Specifically, as qualities of images which may be supported by a terminal device are diversified, and the constructed network environments are diversified, images with general quality may be used in a certain environment, but images with higher quality may be used in another environment.

Recently, as broadcasts with a Full High Definition (FHD) resolution are being served, many users are already accustomed to high-definition and high-quality images, and the service providers and the users are also interested in services beyond an Ultra High Definition (UHD) or more in addition to the FHD.

Accordingly, there is a demand for an image filtering method for further improving subjective/objective image quality.

SUMMARY

An object of the present disclosure is to provide a method and apparatus for enhancing image coding efficiency.

Another object of the present disclosure is to provide a method and apparatus for improving the subjective/objective image quality of an image.

Still another object of the present disclosure is to provide an image filtering method and apparatus.

Yet another object of the present disclosure is to provide a method and apparatus for determining a block unit which applies an adaptive loop filter (hereinafter, referred to as 'ALF') to an image whose encoding or decoding has been completed.

According to an embodiment of the present disclosure, a picture filtering method of a decoding apparatus is provided. The method includes receiving information about an adaptive loop filtering (ALF) control depth, determining an ALF control unit based on information about a split depth of a current block, within a reconstructed picture for a current picture, and the ALF control depth, determining whether ALF is applied to the current block at the ALF control unit level, and performing the ALF for the current block, when it is determined that the ALF is to be applied to the current block, and the current picture is recursively split based on a quad-tree binary-tree (QTBT) structure, and the current block is one of blocks which are split based on the QTBT structure.

According to another embodiment of the present disclosure, a decoding apparatus which performs picture filtering is provided. The decoding apparatus includes an entropy decoder which receives information about an ALF control depth, and a filter which determines an ALF control unit based on information about a split depth of a current block, within a reconstructed picture for a current picture, and the ALF control depth, determines whether ALF is applied to the current block at the ALF control unit level, and performs the ALF for the current block, when it is determined that the ALF is to be applied to the current block, and the current picture is recursively split based on a Quad-tree binary-tree (QTBT) structure, and the current block is one of blocks which are split based on the QTBT structure.

According to still another embodiment of the present disclosure, a picture filtering information encoding method of an encoding apparatus is provided. The method includes determining an ALF control depth, generating information about the determined ALF control depth, determining an ALF control unit including a current block, generating ALF flag information about the ALF control unit, and encoding the information about the ALF control depth and the ALF flag information, and the current block is one of blocks in which a current picture is recursively split based on a QTBT structure.

According to yet another embodiment of the present disclosure, an encoding apparatus which encodes picture filtering information is provided. The encoding apparatus includes a filter which determines an ALF control depth, generates information about the determined ALF control depth, determines an ALF control unit including a current block, and generates ALF flag information about the ALF control unit, and an entropy encoder which encodes the information about the ALF control depth and the ALF flag information, and the current block is one of blocks in which a current picture is recursively split based on a QTBT structure.

According to the present disclosure, it is possible to improve the subjective/objective image quality through the filtering of the reconstructed picture and to increase the coding efficiency. In addition, by adaptively determining the block unit, which applies the ALF to the image whose encoding or decoding has been completed, according to the split structure of the block, it is possible to enhance the compression efficiency.

BRIEF DESCRIPTION OF THE DRAWINGS

FIG. 3 is a diagram exemplarily illustrating a Coding Unit (CU), which is split through a Quad Tree Binary Tree (QTBT) structure, and a signaling method of the QTBT structure.

FIG. 5 is a diagram illustrating an example of the block unit to which the ALF according to an embodiment is applied.

FIG. 9 is a flowchart illustrating a video decoding method according to the decoding apparatus according to an embodiment.

DESCRIPTION OF EXEMPLARY EMBODIMENTS

Figure 1:
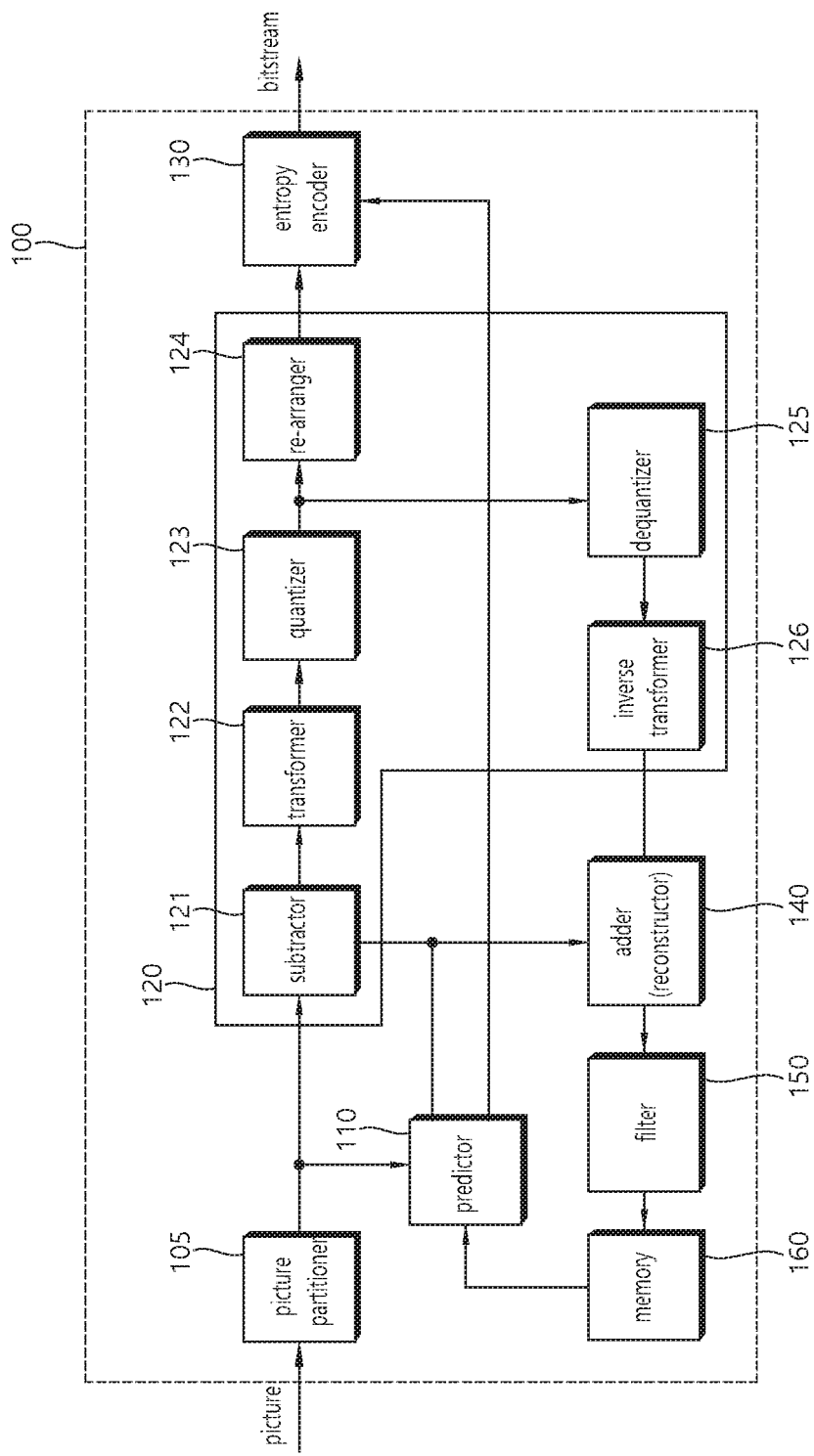
FIG. 1 is a diagram schematically explaining a configuration of an encoding apparatus to which the present disclosure may be applied.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be split into plural elements. The embodiments in which the elements are combined and/or split belong to the disclosure without departing from the concept of the disclosure.

Hereinafter, examples of the present embodiment will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit represents a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of an encoding apparatus to which the present disclosure is applicable.

Referring to FIG. 1, an encoding apparatus 100 may include a picture spliter 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture spliter 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is split or split to a prediction unit or a transform unit. The prediction unit is a unit which is split from a coding unit, and may be a unit of sample prediction. Here, the prediction unit may be split into sub-blocks. The transform unit may be split from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoder 130 may derive residual information for the quantized transform coefficients, and may entropy encode it. The entropy encoding may include an encoding method, for example, an exponential Golomb, a context-adaptive variable length coding (CAVLC), a context-adaptive binary arithmetic coding (CABAC), or the like. The entropy encoder 130 may perform encoding together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
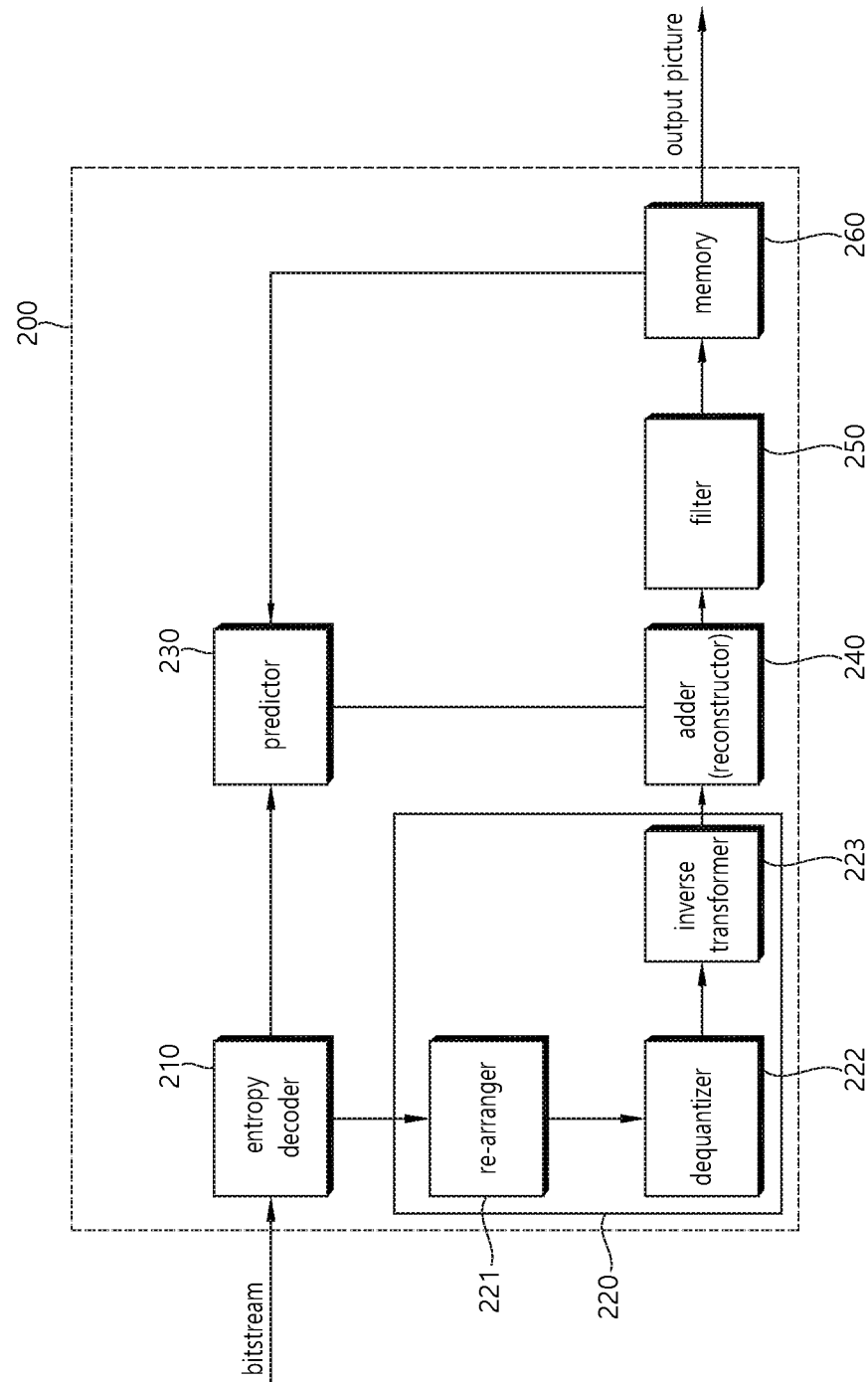
FIG. 2 is a diagram schematically explaining a configuration of a decoding apparatus to which the present disclosure may be applied.

FIG. 2 briefly illustrates a structure of a decoding apparatus to which the present disclosure is applicable.

Referring to FIG. 2, a decoding apparatus 200 may include an entropy decoder 210, a residual processor 220, a predictor 230, an adder 240, a filter 250, and a memory 260. The residual processor 220 may include a re-arranger 221, a dequantizer 222, an inverse transformer 223.

When a bit stream including video information is input, the decoding apparatus 200 may reconstruct a video in association with a process by which video information is processed in the video encoding apparatus.

For example, the decoding apparatus 200 may perform video decoding using a processing unit applied in the encoding apparatus. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or split from the coding unit and may be a unit of sample prediction. Here, the prediction unit may be split into sub-blocks. The transform unit may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding device. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding device.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information about a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding device. Motion information may include a motion vector and a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

In the aforementioned description, the picture spliter 105 may split a picture into blocks having various sizes. The filters 150, 250 may adaptively determine a block unit, which applies the ALF to a picture whose encoding or decoding has been completed, according to the split structure of the block. Hereinafter, the QTBT structure, which is one of block split methods, will be described with reference to FIG. 3, the ALF will be described with reference to FIG. 4, and the block unit to which the ALF is applied will be described with reference to FIGS. 5 to 7.

FIG. 3 exemplarily illustrates the CU which is split through the QTBT structure and a signaling method of the QTBT structure.

The QTBT structure may represent a structure in which a CU or a CTU (or LCU) is split through a quad tree (QT) (hereinafter referred to as 'QT') structure, and split through a binary tree (BT) structure. That is, the QTBT may represent a split structure which is configured in the form of combing the QT structure and the BT structure, and when a picture is coded in a CTU unit, the CTU may be split through the QT structure, and a leaf node of the QT structure may be additionally split through the BT structure. Here, the leaf node may represent a CU which is no longer split from the QT structure, and the leaf node may also be called an end node. In addition, the QT structure may represent a structure in which a CU (or CTU) having the 2N×2N size is split into four sub-CUs having the N×N size, and the BT structure may represent a structure in which the CU having the 2N×2N size is split into two sub-CUs having the N×2N (or nL×2N, nR×2N) size, or two sub-CUs having the 2N×N (or 2N×nU, 2N×nD) size.

(a) of FIG. 3 illustrates an example of blocks split through the QTBT structure. Referring to (a) of FIG. 3, the CU may be split into square CUs having the deeper depth through the QT structure, and additionally, a specific CU among the square CUs may be split into non-square CUs having the deeper depth through the BT structure.

(b) of FIG. 3 illustrates an example of syntax signaling of the QTBT structure. The solid line illustrated in (b) of FIG. 3 may represent the QT structure, and the dotted line may represent the BT structure. In addition, a top to bottom direction may represent the syntaxes for the CUs from the upper depth to the deeper depth. In addition, a left to right direction may represent the syntaxes for the upper left, upper right, lower left, and lower right CUs. Specifically, the number at the top may represent the syntax for a CU at the n depth, the numbers at the second location from the top are the syntaxes for CUs at the n+1 depth, the numbers at the third location from the top are the syntaxes for CUs at the n+2 depth, and the numbers at the fourth location from the top are the syntaxes for CUs at the n+3 depth. In addition, the numbers indicated in bold may represent values of the syntaxes for the QT structure, and the numbers not indicated in bold may represent values of the syntaxes for the BT structure.

Referring to (b) of FIG. 3, a QT split flag which represents whether a CU is split through the QT structure may be transmitted. That is, a flag which represents whether the CU having the 2N×2N size is split into four sub-CUs having the N×N size may be transmitted. For example, when a value of the QT split flag for the CU is 1, the CU may be split into four sub-CUs, and when a value of the QT split flag for the CU is 0, the CU may not be split. In addition, information about the maximum CU size, the minimum CU size, the maximum depth, and the like in the QT structure may be transmitted to adjust the QT structure for an input image. The aforementioned information about the QT structure may be transmitted to each of slice types, or transmitted to each of image components (luma component, chroma component, and the like).

Meanwhile, information about the BT structure may be transmitted to the end node which is no longer split in the QT structure. That is, information about the BT structure for the CU corresponding to the end node in the QT structure may be transmitted. Here, the information including the information about the BT structure may be called additional split information. For example, the BT split flag which represents whether the CU is split through the BT structure, that is, whether the BT structure is applied to the CU may be transmitted. Specifically, when the value for the BT split flag is 1, the CU may be split into two sub-CUs, and when the value for the BT split flag is 0, the CU may not be split. In addition, information about the maximum CU size, the minimum CU size, the maximum depth, and the like in the BT structure may be transmitted to adjust the BT structure for the input image. The aforementioned information about the BT structure may be transmitted to each of the slice types, or transmitted to each of the image components. When the CU is split through the BT structure, the CU may be split in a horizontal or vertical direction. A BT split mode index which represents in which direction the CU is split, that is, the split type of the CU may also be further transmitted.

Meanwhile, the split structure of a luma component block (hereinafter, luma block) may also be set to be the same as or differently from the split structure of a chroma component block (hereinafter, chroma block). Whether the split structure of the chroma block is dependent on or independent of the split structure of the luma block may be determined based on the slice type. For example, the slice type may be one of an I (intra) slice, a P (predictive) slice, and a B (bi-predictive) slice. The I slice represents a slice which is decoded by using only intra prediction. The P slice represents a slice which may be decoded by using intra prediction or inter prediction, and the inter prediction represents a prediction in which at most one motion vector and reference picture index are used to predict the sample values of each block. The B slice represents a slice which may be decoded by using intra prediction or inter prediction, and the inter prediction represents a prediction in which at most two motion vectors and reference picture indices are used to predict the sample values of each block.

When the slice type of the current slice is the I slice, the luma block and the chroma block within the I slice may have different (independent) split structures. That is, in this case, the aforementioned split flags may be signaled for the chroma block separately from those for the luma block.

Meanwhile, when the slice type of the current slice is the P slice or the B slice, the luma block and the chroma block within the corresponding slice may have the same split structure as each other.

Figure 4:
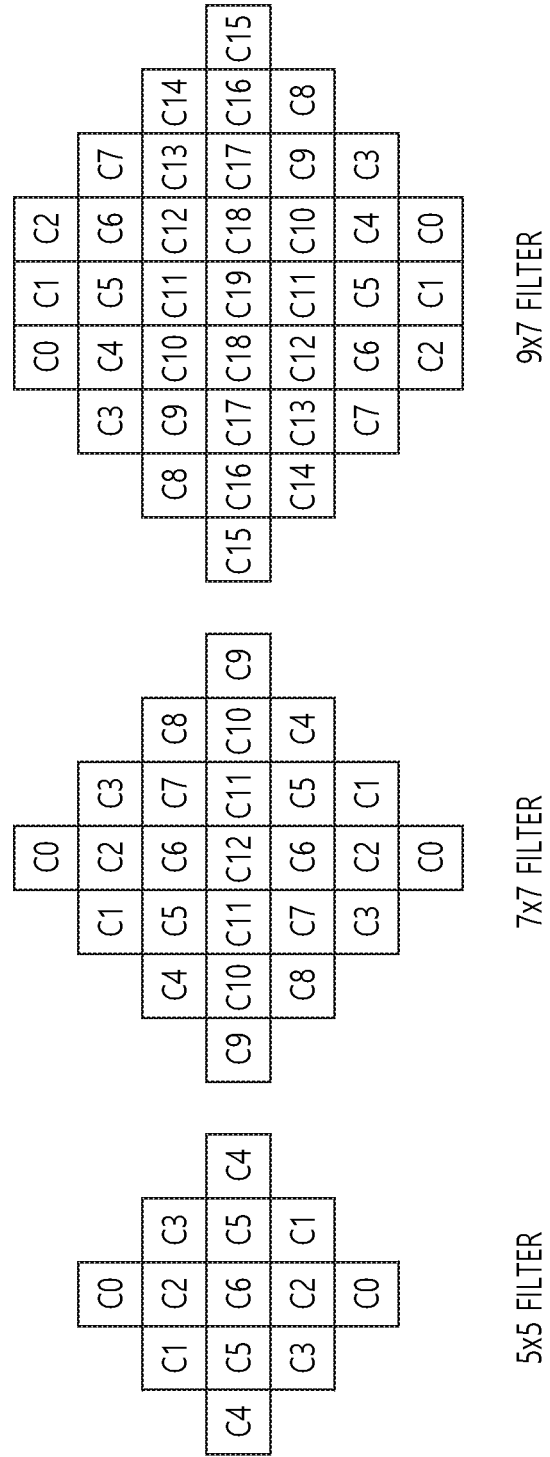
FIG. 4 is a diagram illustrating an example of the ALF.

FIG. 4 is a diagram illustrating an example of the ALF.

In performing the filtering according to the present disclosure, the encoding apparatus 100 and the decoding apparatus 200 may select and use one filter from filters having predetermined filter shapes. That is, the encoding apparatus 100 and the decoding apparatus 200 may perform the filtering based on a filter selected from the filters having the predetermined filter shapes.

Meanwhile, according to the present disclosure, filter coefficients may be assigned according to the filter shapes. Hereinafter, in the present specification, the location and/or unit to which each filter coefficient is assigned may be referred to as a filter tap. At this time, one filter coefficient may be assigned to each filter tap, and the forms in which the filter taps are arranged may correspond to the filter shapes.

In addition, hereinafter, the filter tab which is disposed at the center of the filter shape in the present specification may be referred to as a center filter tab. The filter tabs are symmetrical around the center filter tab which is disposed at the center having the filter shape. For example, the filter tabs may be numbered in a raster scan order, and numbered in an ascending order from the beginning to the center tap and in a descending order from the center tap to the end. The remaining filter coefficients except for the filter coefficients assigned to the center filter tap may also be each assigned equally to the two filter taps which exist at locations corresponding to each other based on the center filter tap. In FIG. 4, C6 represents a center tap for a 5×5 filter, C12 represents a center tap for a 7×7 filter, and C19 represents a center tap for a 9×7 filter.

Meanwhile, the shapes and sizes of the filters described above are illustrative, and filters having more various shapes and sizes may be used. The use of the filters having various shapes and sizes is because the shape and size of a suitable filter vary according to the characteristics of the image. In the encoding/decoding process, a filter having the best Rate-Distortion (RD) Cost may be selected and used. Since the size of the image used is diversified, and particularly, high-definition images are used, the filters having various shapes (and sizes) need to be used for optimal filtering.

The encoding apparatus 100 and/or the decoding apparatus 200 may determine whether to perform the filtering, the filter shape, and/or the filter coefficient through a predetermined process. Filtering for the reconstructed picture may be applied to minimize the error generated in a compression encoding process and to improve subjective/objective image quality, and the filter shape and/or the filter coefficient may be determined to minimize the error. Information about the determined filter may be transmitted to the decoding apparatus 200, and the decoding apparatus 200 may determine the filter shape and/or the filter coefficient based on the transmitted information.

More specifically, the encoding apparatus 100 may determine the filter coefficient and/or the filter shape which minimize the error between the reconstructed image and the original picture in a picture unit, and transmit the information about the determined filter coefficient and/or filter shape to the decoding apparatus 200. The decoding apparatus 200 may apply the ALF to the reconstructed image whose decoding has been completed, based on the information about the filter coefficient and/or the filter shape received from the encoding apparatus 100.

The filter coefficient of the ALF may be an integer or a real number, and the encoding apparatus 100 may transmit information about n filters (n is any positive integer) having an M×M (M is any positive integer), M×N (N is any positive integer), or M×1 shape to the decoding apparatus 200. For example, as illustrated in FIG. 4, the filter may have the form of 5×5, 7×7 (or more M×M shape), 9×7 (M×N shape), or the like. The decoding apparatus 200 may determine whether the ALF is applied in the unit of a Largest Coding Unit (LCU) or a Coding Unit (CU).

FIG. 5 is a diagram illustrating an example of a block unit to which the ALF according to an embodiment is applied.

In (a) of FIG. 5 and (b) of FIG. 5, shaded blocks may refer to blocks to which the ALF is applied, and unshaded blocks may refer to blocks to which the ALF is not applied.

(a) of FIG. 5 illustrates an example of applying the ALF at the Largest Coding Unit (LCU) level. Blocks A to F illustrated in (a) of FIG. 5 are blocks at the LCU level. The ALF is not applied to the blocks A and D, and the ALF may be applied to the blocks B, C, E, and F.

In an embodiment, whether the ALF is applied may be determined by a syntax which represents whether the ALF is applied. The syntax which represents whether the ALF is applied may be expressed by, for example, alf_control_flag. The ALF may not be applied when the alf_control_flag is signaled as 0, and the ALF may be applied when the alf_control_flag is signaled as 1. In (a) of FIG. 5, the alf_control_flag signaled to the blocks A and D may be 0, and the alf_control_flag signaled to the blocks B, C, E, and F may be 1.

(b) of FIG. 5 illustrates an example of applying the ALF at a Coding Unit (CU) level at which the LCU is split. Referring to (b) of FIG. 5, it may be confirmed that the blocks A to F at the LCU level are each split into four based on the QT structure. It may be confirmed that since the ALF is applied only to one block of the lower four blocks of the block A and the ALF is not applied to the other three blocks, in (b) of FIG. 5, whether the ALF is applied is determined at the CU level at which the LCU is split once into the QT structure. In (b) of FIG. 5, the alf_control_flag signaled to the unshaded blocks may be 0, and the alf_control_flag signaled to the shaded blocks may be 1.

Figure 6:
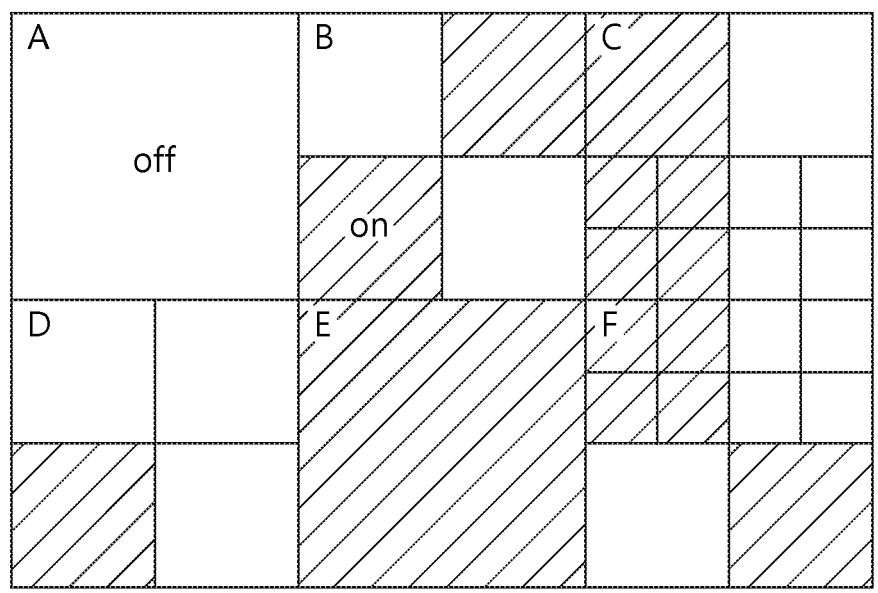
FIG. 6 is a diagram illustrating an example of the block unit to which the ALF according to another embodiment is applied.

FIG. 6 is a diagram illustrating an example of a block unit to which the ALF according to another embodiment is applied.

Referring to FIG. 6, the blocks A and E at the LCU level were not subjected to the QT split based on the LCU (that is, no additional split) (QT split phase 0), the blocks B and D at the LCU level were subjected to the QT split once based on the LCU (that is, the LCU is split into four CUs) (QT split phase 1), and the blocks C and F at the LCU level were subjected to the QT split twice based on the LCU (QT split phase 2).

The block level at which whether the ALF is applied is determined may be determined based on information about the ALF control depth or information about the ALF control pixel. The information about the ALF control depth or the information about the ALF control pixel may be generated by the encoding apparatus 100 and transmitted to the decoding apparatus 200. The information about the ALF control depth may be signaled through, for example, an alf_control_depth syntax, and the information about the ALF control pixel may be signaled through, for example, an alf_control_pixel syntax.

The ALF control depth may mean the maximum value of the split depth of the block level at which whether the ALF is applied is determined. For example, when the ALF control depth is 1, the maximum value of the split depth of the block level at which whether the ALF is applied is determined may be 1. The information about the ALF control depth may be signaled from a slice header, and the information about the ALF control depth may be set to the same value in all slice headers of the current picture. Since the blocks A to F illustrated in FIG. 6 belong to the same picture, all of the ALF control depths may be the same.

At this time, the split depth may mean the QT split depth of the corresponding block, but the meaning of the split depth is not limited thereto. For example, in FIG. 7 in which the QTBT structure is illustrated, the split depth may mean the sum of the QT split depth and the BT split depth.

Referring to the block C at the LCU level in FIG. 6, it may be confirmed that when the ALF control depth is 1, whether the ALF is applied may not be determined at the block level at which the QT split is performed twice based on the LCU (that is, the split depth is 2), but whether the ALF is applied may be determined at the block level at which the QT split is performed once (that is, the split depth is 1) based on the LCU.

The ALF control pixel may mean the minimum value of the number of pixels at the block level at which whether the ALF is applied is determined. For example, when the ALF control pixel is 1024, the minimum value of the number of pixels at the block level at which whether the ALF is applied is determined may be 1024.

Referring to the block C at the LCU level in FIG. 6, it may be confirmed that when the ALF control pixel is 1024, whether the ALF is applied may not be determined at the block level at which the QT split is performed twice based on the LCU, that is, the block level at which the number of pixels is 256, but whether the ALF is applied may be determined at the block level at which the QT split is performed once based on the LCU, that is, the block level at which the number of pixels is 1024.

Figure 7:
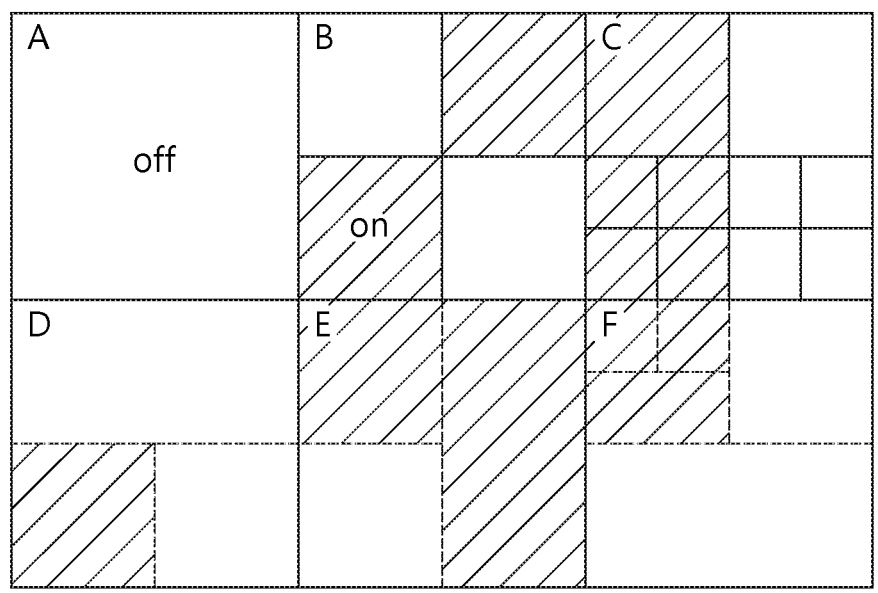
FIG. 7 is a diagram illustrating an example of the block unit to which the ALF according to still another embodiment is applied.

FIG. 7 is a diagram illustrating an example of a block unit to which the ALF according to still another embodiment is applied.

Referring to FIG. 7, the block A at the LCU level was not subjected to the QT split and was not subjected to the BT split based on the LCU, the block B at the LCU level was subjected to the QT split once and was not subjected to the BT split based on the LCU, and the block C at the LCU level was subjected to the QT split twice and was not subjected to the BT split based on the LCU. In addition, each of the blocks D and E at the LCU level was not subjected to the QT split and was subjected to the BT split twice based on the LCU, and the block F at the LCU level was subjected to the QT split and was subjected to the BT split four times based on the LCU.

The information about the ALF control depth or the information about the ALF control pixel may be generated by the encoding apparatus 100 and transmitted to the decoding apparatus 200. The information about the ALF control depth may be signaled through, for example, an alf_control_depth syntax, and the information about the ALF control pixel may be signaled through, for example, an alf_control_pixel syntax.

The ALF control depth may mean the maximum value of the split depth at the block level at which whether the ALF is applied is determined. For example, when the ALF control depth is 2, the maximum value of the split depth at the block level at which whether the ALF is applied is determined may be 2. At this time, the split depth may mean the sum of the QT split depth and the BT split depth of the corresponding block. For example, the split depth of block E illustrated in FIG. 7 may be 2, which is the sum of 0 which is a QT split depth and 2 which is a BT split depth.

Referring to the block E at the LCU level in FIG. 7, it may be confirmed that when the ALF control depth is 2, whether the ALF is applied may be determined even at the block level at which the BT split is performed twice (the split depth is 2) based on the LCU.

The encoding apparatus 100 according to an embodiment may determine an ALF control unit based on the information about the split depth of the current block, within the reconstructed picture for the current picture, and the ALF control depth. In the present specification, the "ALF control unit" may mean a block level at which whether the ALF is applied is determined. The ALF control unit level may be a Largest Coding Unit (LCU) level or a Coding Unit (CU) level at which the LCU is split at least once. That is, the ALF control unit level may be determined according to how many times it is split from the LCU based on the QTBT structure.

The ALF control unit may be determined based on the following Equation 1.

$$AlfControlDepth=\min(alf\_control\_depth, current\_depth) \quad \text{Equation 1}$$

In the Equation 1, the alf_control_depth represents the ALF control depth, the current_depth represents the split depth of the current block, and the AlfControlDepth represents the split depth of the ALF control unit. The Equation 1 represents that the split depth of the ALF control unit is determined as a smaller value of the ALF control depth and the split depth of the current block.

When the split depth of the current block is determined as the QT split depth, the Equation 1 may be expressed by the following Equation 2.

$$AlfControlDepth=\min(alf\_control\_depth, current\_QT\_depth) \quad \text{Equation 2}$$

In the Equation 2, the current_QT_depth represents the QT split depth of the current block.

When the split depth of the current block is determined as the BT split depth, the Equation 1 may be expressed by the following Equation 3.

$$AlfControlDepth=\min(alf\_control\_depth, current\_BT\_depth) \quad \text{Equation 3}$$

In the Equation 3, the current_BT_depth represents the BT split depth of the current block.

When the split depth of the current block is determined as the sum of the QT split depth and the BT split depth, the Equation 1 may be expressed by the following Equation 4.

$$AlfControlDepth=\min(alf\_control\_depth, current\_QT\_depth+current\_BT\_depth) \quad \text{Equation 4}$$

The decoding apparatus 200 may determine the ALF control unit, based on the information about the ALF control depth received from the encoding apparatus 100 and the split structure of the current picture.

Meanwhile, a method of determining the ALF control unit is not limited to the method of comparing the split depth of the current block with the ALF control depth. For example, the ALF control unit may also be determined based on the number of pixels, the number of horizontal pixels in the block, the number of vertical pixels in the block, and the like.

The ALF control pixel may mean the minimum value of the number of pixels at the block level at which whether the ALF is applied is determined. For example, when the ALF control pixel is 1024, the minimum value of the number of pixels at the block level at which whether the ALF is applied is determined may be 1024.

Referring to the block E at the LCU level in FIG. 7, it may be confirmed that when the ALF control pixel is 1024, whether the ALF is applied may be determined even at the block level at which the number of pixels is 1024 (that is, the minimum block level in FIG. 7).

The decoding apparatus 200 according to an embodiment may determine the ALF control unit by comparing the number of pixels of the current block with the ALF control pixel. The decoding apparatus 200 may determine a larger value of a value of the number of pixels of the current block and a value of the number of ALF control pixels as the number of pixels of the ALF control unit. The method of determining the ALF control unit based on the number of pixels may be expressed by the following Equation 5.

$$AlfControlPixel=\max(alf\_control\_pixel, current\_pixel) \quad \text{Equation 5}$$

In the Equation 5, the alf_control_pixel represents the ALF control pixel, the current pixel represents the number of pixels of the current block, and the AlfControlPixel represents the number of pixels of the ALF control unit. The Equation 5 represents that the number of pixels of the ALF control unit is determined as a larger value of a value of the ALF control pixel and the number of pixels of the current block.

When the current picture is split into the BT structure, the Equation 5 may be expressed by the following Equation 6.

$$AlfControlPixel=\max(alf\_control\_pixel, current\_BT\_pixel) \quad \text{Equation 6}$$

In the Equation 6, the current_BT_pixel represents the number of pixels of the current block in the BT structure. The meanings of the alf_control_pixel and the AlfControlPixel are as described above in the Equation 5.

The syntaxes described in the Equations 1 to 6 are merely examples, and the syntaxes may be replaced with other different syntaxes. For example, the "alf_control_depth" which is a syntax representing the ALF control depth may be replaced with "alf_control_depth_syntax", "alf_control_level", "alf_information", "alf_control_level_information", and the like, and the syntaxes which may replace the "alf_control_depth" are not limited thereto.

According to an embodiment of the present disclosure, the encoding apparatus 100 may adaptively generate the information about the ALF control depth or the ALF control pixel according to a structure in which the picture is split, and transmit the generated information about the ALF control depth or the ALF control pixel to the decoding apparatus 200. The encoding apparatus 100 may adaptively generate the information about the ALF control depth or the ALF control pixel according to a structure in which the picture is split, and transmit the generated information to the decoding apparatus 200, thereby improving the compression efficiency of the image.

According to an embodiment of the present disclosure, the decoding apparatus 200 may adaptively determine the block level at which whether the ALF is applied is determined, according to a structure in which the picture is split, based on the information about the ALF control depth or the ALF control pixel. For example, the decoding apparatus 200 may adaptively determine the block level at which whether the ALF is applied is determined, according to whether that the picture was split into the QT structure or split into the QTBT structure, based on the information about the ALF control depth or the ALF control pixel.

Figure 8:
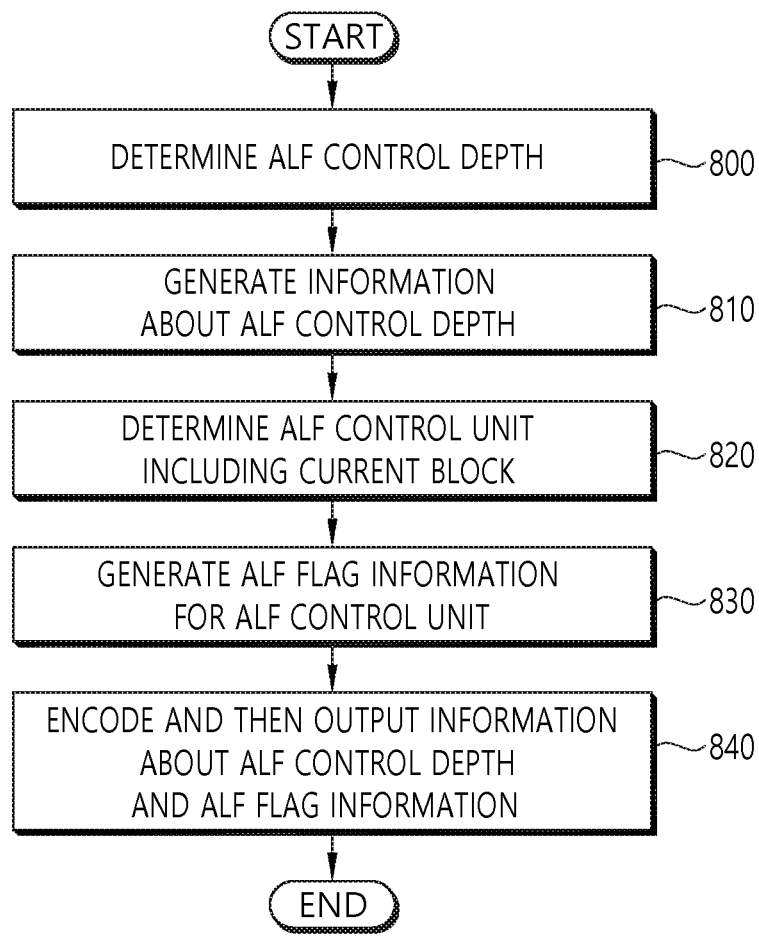
FIG. 8 is a flowchart illustrating a video encoding method according to the encoding apparatus according to an embodiment.

FIG. 8 is a flowchart illustrating a video encoding method by the encoding apparatus according to an embodiment. The method disclosed in FIG. 8 may be performed by the encoding apparatus 100 disclosed in FIG. 1. Specifically, for example, steps 800, 810, 820 and 830 illustrated in FIG. 8 may be performed by the filter 150 of the encoding apparatus 100, and a step 840 may be performed by the entropy encoder 130 of the encoding apparatus 100.

In the step 800, the encoding apparatus 100 may determine the ALF control depth. More specifically, the encoding apparatus 100 may adaptively determine the information about the ALF control depth or the ALF control pixel according to the structure in which the picture is split.

The split depth of the current block for determining the ALF control unit may be variously determined. For example, when the picture is split into the QTBT structure, the split depth of the current block may be determined as the QT split depth or determined as the BT split depth. Alternatively, when the picture is split into the QTBT structure, the split depth of the current block may be determined as the sum of the QT split depth and the BT split depth. The encoding apparatus 100 according to an embodiment may adaptively determine the information about the ALF control depth or the ALF control pixel in consideration of the fact that the split depths are different from each other according to the structure in which the picture is split. Additionally, the encoding apparatus 100 may also consider the RD cost related to the filtering efficiency of the ALF in the process of determining the information about the ALF control depth or the ALF control pixel.

In the step 810, the encoding apparatus 100 may generate the information about the ALF control depth. More specifically, the encoding apparatus 100 may generate the information about the ALF control depth for signaling the ALF control depth, based on the ALF control depth which is determined in the step 800. Alternatively, the encoding apparatus 100 may generate the information about the ALF control pixel for signaling the ALF control pixel, based on the ALF control pixel which is determined in the step 800.

In the step 820, the encoding apparatus 100 may determine the ALF control unit including the current block. More specifically, the encoding apparatus 100 may determine the ALF control unit based on the information about the split depth of the current block, within the reconstructed picture for the current picture, and the ALF control depth. Alternatively, the encoding apparatus 100 may also determine the ALF control unit based on the information about the number of pixels of the current block and the ALF control pixel.

The encoding apparatus 100 according to an embodiment may determine the ALF control unit by comparing the ALF control depth with the split depth of the current block based on the aforementioned Equations 1 to 4 described above with reference to FIG. 7. Alternatively, the encoding apparatus 100 may determine the ALF control unit by comparing the ALF control pixel with the split depth of the current block based on the aforementioned Equations 5 and 6 described above with reference to FIG. 7.

In the step 830, the encoding apparatus 100 may generate the ALF flag information about the ALF control unit. More specifically, the encoding apparatus 100 may determine whether the ALF is applied to the current block at the ALF control unit level, and based on the determination, the encoding apparatus 100 may generate the ALF flag information representing whether the ALF is applied to the current block at the ALF control unit level.

In the step 840, the encoding apparatus 100 may encode and then output the information about the ALF control depth and the ALF flag information. That is, the encoding apparatus 100 may transmit the information about the ALF control depth and the ALF flag information to the decoding apparatus 200.

The encoding apparatus 100 according to an embodiment may encode and output the information about the ALF control pixel together with the ALF flag information instead of the information about the ALF control depth. Alternatively, the encoding apparatus 100 may also encode and then output the information about the ALF control depth, the information about the ALF control pixel, and the ALF flag information. The encoded information may be output in the form of a bitstream, and the bitstream may be transmitted to the outside (for example, the decoding apparatus) via a (digital) storage medium or a network. Here, the storage medium may include various storage media such as USB, SD, CD, DVD, Blu-ray, HDD, and SDD as digital storage media.

FIG. 9 is a flowchart illustrating a video decoding method by the decoding apparatus according to an embodiment. The method disclosed in FIG. 9 may be performed by the decoding apparatus 200 disclosed in FIG. 2. Specifically, for example, a step 900 illustrated in FIG. 9 may be performed by the entropy decoder 210 of the decoding apparatus 200, and steps 910, 920 and 930 may be performed by the filter 250 of the decoding apparatus 200.

In the step 900, the decoding apparatus 200 may receive the information about the ALF control depth. More specifically, the decoding apparatus 200 may receive, from the encoding apparatus 100, the information about the ALF control depth generated and encoded by the encoding apparatus 100, and decode the received information about the ALF control depth.

In the step 910, the decoding apparatus 200 may determine the ALF control unit based on the information about the split depth of the current block, within the reconstructed picture for the current picture, and the ALF control depth.

In an embodiment, when the value of the split depth of the current block is greater than the value of the ALF control depth, the decoding apparatus 200 may determine the ALF control unit based on the value of the ALF control depth. More specifically, when the value of the split depth of the current block is greater than the value of the ALF control depth, the decoding apparatus 200 may determine the ALF control depth as the split depth of the ALF control unit.

In addition, when the value of the split depth of the current block is smaller than the value of the ALF control depth, the decoding apparatus 200 may determine the ALF control unit based on the value of the split depth of the current block. More specifically, when the value of the split depth of the current block is smaller than the value of the ALF control depth, the decoding apparatus 200 may determine the split depth of the current block as the split depth of the ALF control unit.

In addition, when the value of the split depth of the current block and the value of the ALF control depth are the same, the decoding apparatus 200 may determine the ALF control unit based on the split depth of the current block or the value of the ALF control depth.

In addition, the method of determining the ALF control unit is not limited to the method of comparing the split depth of the current block with the ALF control depth. For example, the ALF control unit may also be determined based on the number of pixels, the number of horizontal pixels in the block, the number of vertical pixels in the block, and the like.

Embodiments for determining the ALF control unit in the step 900 may be based on the aforementioned Equations 1 to 6 described above with reference to FIG. 7.

The current picture according to the present disclosure may be recursively split based on the QTBT structure, and the current block according to the present disclosure may be one of the blocks split based on the QTBT structure. Accordingly, the split depth of the current block may be determined as the sum of the QT split depth and the BT split depth, and in some cases, may also be determined as the QT split depth or the BT split depth. While the present disclosure mainly describes that the picture is split based on the QTBT structure, the structure in which the picture is split is not limited to the QTBT structure.

The decoding apparatus 200 may determine the ALF control unit based on the determined split depth of the ALF control unit and the split structure of the current picture.

In the step 920, the decoding apparatus 200 may determine whether the ALF is applied to the current block at the ALF control unit level. More specifically, the decoding apparatus 200 may receive from the encoding apparatus 100 the ALF flag representing whether the ALF is applied to the current block at the ALF control unit level, and determine whether the ALF is applied to the current block based on the received ALF flag.

For example, when the ALF flag received from the encoding apparatus 100 is 0, the decoding apparatus 200 may determine that the ALF is not applied to the current block included in the ALF control unit level. In another example, when the ALF flag received from the encoding apparatus 100 is 1, the decoding apparatus 200 may determine that the ALF is applied to the current block included in the ALF control unit level.

In the step 930, when it is determined that the ALF is to be applied to the current block, the decoding apparatus 200 may perform the ALF for the current block.

According to the aforementioned present disclosure, it is possible to adaptively determine, according to the structure in which the picture is split, the block unit in which the ALF is applied to the image (reconstructed picture) whose encoding or decoding has been completed, thereby improving the overall coding efficiency.

In the above-described embodiments, the methods are described based on the flowcharts as a series of steps or blocks, but the present disclosure is not limited to the order of steps, and a certain step may occur in different order from or simultaneously with a step different from that described above. In addition, those skilled in the art will understand that the steps shown in the flowchart are not exclusive and other steps may be included or one or more steps in the flowcharts may be deleted without affecting the scope of the present disclosure.

The above-described method according to the present disclosure may be implemented in the form of software, and the encoding apparatus and/or the decoding apparatus according to the present disclosure may be included in the apparatus for performing image processing of, for example, a TV, a computer, a smartphone, a set-top box, a display device, and the like.

When the embodiments in the present document are implemented in software, the above-described method may be implemented as a module (process, function, and the like) for performing the above-described function. The module may be stored in a memory and executed by a processor. The memory may be located inside or outside the processor, and may be coupled with the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium and/or other storage devices.

What is claimed is:

1. A picture filtering method of a decoding apparatus, the picture filtering method comprising:
receiving information about an adaptive loop filtering (ALF) control depth;
determining an ALF control unit based on information about a split depth of a current block, within a reconstructed picture for a current picture, and the ALF control depth;
determining whether ALF is applied to the current block at the ALF control unit level; and
performing the ALF for the current block, when it is determined that the ALF is to be applied to the current block,
wherein the current picture is recursively split based on a quad-tree binary-tree (QTBT) structure, and the current block is one of blocks which are split based on the QTBT structure,
wherein the split depth of the current block represents the sum of a QT split depth and a BT split depth of the current block, and
wherein the ALF control unit is determined based on the following equation, $$AlfControlDepth = \min(alf\_control\_depth, current\_QT\_depth + current\_BT\_depth)$$

where the alf_control_depth represents the ALF control depth, the current_QT_depth represents the QT split depth of the current block, the current_BT_depth represents the BT split depth of the current block, and the AlfControlDepth represents the ALF control unit.

2. The picture filtering method of claim 1, wherein the determining of whether the ALF is applied to the current block comprises
receiving an ALF flag which represents whether the ALF is applied to the current block at the ALF control unit level; and
determining whether the ALF is applied to the current block based on the ALF flag.

3. The picture filtering method of claim 2, wherein the determining of whether the ALF is applied to the current block based on the ALF flag comprises determining that the ALF is not applied to the current block, when a value of the ALF flag is 0.

4. The picture filtering method of claim 2, wherein the determining of whether the ALF is applied to the current block based on the ALF flag comprises determining that the ALF is applied to the current block, when a value of the ALF flag is 1.

5. The picture filtering method of claim 1, wherein the determining of the ALF control unit determines the ALF control unit based on a value of the ALF control depth, when the value of the split depth of the current block is greater than the value of the ALF control depth.

6. The picture filtering method of claim 1, wherein the determining of the ALF control unit determines the ALF control unit based on the value of the split depth of the current block, when the value of the split depth of the current block is smaller than the value of the ALF control depth.

7. The picture filtering method of claim 1, wherein the ALF control unit is determined based on the following equation, AlfControlDepth=min (alf_control_depth, current_depth) where the alf_control_depth represents the ALF control depth, the current_depth represents the split depth of the current block, and the AlfControlDepth represents the ALF control unit.

8. The picture filtering method of claim 1, wherein the split depth of the current block represents a QT split depth of the current block.

9. The picture filtering method of claim 8, wherein the ALF control unit is determined based on the following equation, AlfControlDepth=min (alf_control_depth, current_QT_depth) where the alf_control_depth represents the ALF control depth, the current_QT_depth represents the QT split depth of the current block, and the AlfControlDepth represents the ALF control unit.

10. The picture filtering method of claim 1, wherein the ALF control unit level is determined based on whether how many times it has been split from a Largest Coding Unit (LCU) based on the QTBT structure.

11. The picture filtering method of claim 1, wherein the information about the ALF control depth is signaled from a slice header, and the information about the ALF control depth is set to the same value in all of the slice headers of the current picture.

12. A decoding apparatus which performs picture filtering, the decoding apparatus comprising:
- an entropy decoder which receives information about an ALF control depth; and
- a filter which determines an ALF control unit based on information about a split depth of a current block, within a reconstructed picture for a current picture, and the ALF control depth, determines whether an ALF is applied to the current block at the ALF control unit level, and performs the ALF for the current block, when it is determined that the ALF is to be applied to the current block,
- wherein the current picture is recursively split based on a QTBT structure, and the current block is one of blocks which are split based on the QTBT structure,
- wherein the split depth of the current block represents the sum of a QT split depth and a BT split depth of the current block, and
- wherein the ALF control unit is determined based on the following equation, $$AlfControlDepth=\min(alf\_control\_depth, current\_QT\_depth+current\_BT\_depth)$$

where the alf_control_depth represents the ALF control depth, the current_QT_depth represents the QT split depth of the current block, the current_BT_depth represents the BT split depth of the current block, and the AlfControlDepth represents the ALF control unit.

13. A picture filtering information encoding method of an encoding apparatus, the picture filtering information encoding method comprising:
- determining an ALF control depth;
- generating information about the determined ALF control depth;
- determining an ALF control unit comprising a current block;
- generating ALF flag information about the ALF control unit; and
- encoding the information about the ALF control depth and the ALF flag information,
- wherein the current block is one of blocks in which a current picture is recursively split based on a QTBT structure,
- wherein a split depth of the current block represents the sum of a QT split depth and a BT split depth of the current block, and
- wherein the ALF control unit is determined based on the following equation, $$AlfControlDepth=\min(alf\_control\_depth, current\_QT\_depth+current\_BT\_depth)$$

where the alf_control_depth represents the ALF control depth, the current_QT_depth represents the QT split depth of the current block, the current_BT_depth represents the BT split depth of the current block, and the AlfControlDepth represents the ALF control unit.

* * * * *